Figure 1:
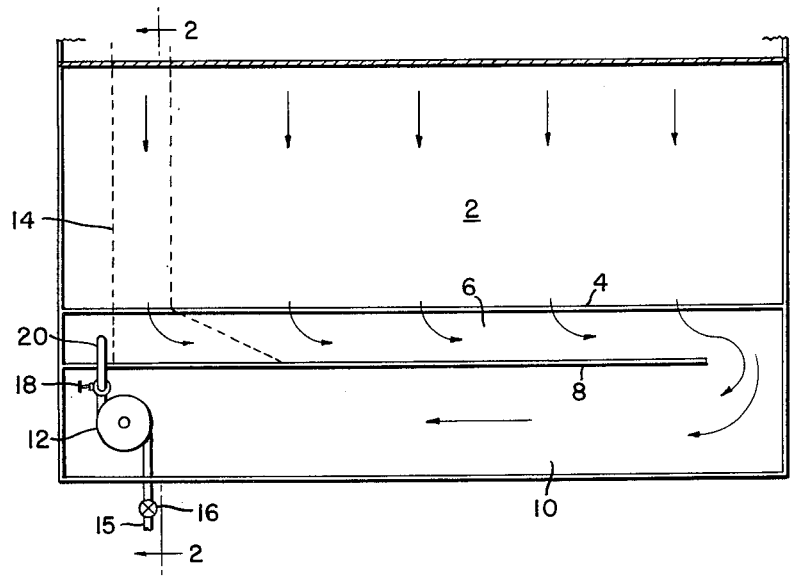

INVENTORS
ORLAN M. ARNOLD
BY RAYMOND H. HARBIN

ATTORNEYS

3,173,879
METHOD FOR HANDLING OVERSPRAY MATERIALS

Orlan M. Arnold, Grosse Pointe, and Raymond H. Harbin, Detroit, Mich., assignors to Ajem Laboratories, Inc., Detroit, Mich.
Original application Dec. 31, 1954, Ser. No. 479,032, now Patent No. 2,982,723, dated Nov. 23, 1959. Divided and this application July 18, 1960, Ser. No. 48,511
9 Claims. (Cl. 252—364)

This invention relates to methods and materials for treating overspray paint. More particularly, it relates to the recovery of overspray paint in liquid or semi-liquid form. This application is a division of our copending application Serial No. 479,032, filed December 31, 1954, and now Patent No. 2,982,723.

One of the important problems in the use of sprayed paints is the collection of the overspray paint in an economical and efficient manner. The quantity of overspray paint may represent a substantial portion of the original material. For example, in some paint operations 70% of the paint results in overspray. Irrespective of whether this overspray paint is to be reprocessed so it can be used again, it must be collected and prevented from affecting other operations or environments.

In general, relatively efficient air washing systems have been used in which the paint particles are captured in a water solution. This solution ordinarily contains surface active agents provided to kill, coagulate, and float the paint material so as to prepare it for easy disposition, for example, by scooping the solid components out of one section of the spray booth. Such a method works quite satisfactory with many types of paint materials provided efficient formulations of paint killing materials are used. Thus, lacquer type materials and most paints can be handled effectively by such processes. However, other types of paints are not readily handled in this manner, and merely form gummy masses which adhere to the surfaces of the spray booth to the moving parts of the air washer.

One example of such a paint is the material referred to as "chassis-black paint" and which is used to paint, for example, the understructure of automobiles. There are many different formulations of chassis-black paint, but ordinarily it is formed of gilsonite or asphalt dissolved or dispersed in a peroleum base solvent such as mineral spirits. A low boiling solvent of the aliphatic type is generally used so that the parts will dry quickly. The base components are asphalt type materials including gilsonite, also called asphaltite, which is a natural form of bitumen. Sometimes a small quantity of carbon black pigment is introduced to increase the blackness and luster of the dried paint. The asphalt material is readily soluble in the mineral spirit solvent so that substantial quantities can be dispersed in a stable form. Other types of chassis-black paint include rosins or other low cost resin materials.

In part, this material is difficult to handle because of the characteristics of the bituminous material and in part because of the absence of, or limited quantity of, suspended pigment which in other types of paint assists in forming the solid phase. In addition, these bituminous based paints readily wet metal surfaces and accordingly form a coating on the exposed surfaces of the spray booth so that it is difficult to keep the spray booth in clean opearting condition. Moreover, paint of this type is ordinarily relatively cheap and is used in applications where a large volume of overspray is produced, and it is thus rendered even more difficult to successfully dispose of the overspray.

The present invention provides an improved method for handling overspray paint materials, particularly those including bituminous type materials, in which the overspray is retained in a liquid state in the spray booth so that it can be handled hydraulically, eliminating the difficult and expensive cleaning operations ordinarily required when paint of this type is being used. In the present method, instead of converting the paints to solid conglomerate, the paints are treated by reagents that cause the paint to form into a concentrated viscous or semi-viscous liquid state which will not stick to the sides of the paint spray booth, and which can be collected by flotation with the use of suitable hydraulic equipment.

In order to accomplish this, a solvent of higher boiling point and which will not be vaporized under the usual operating conditions of the spray booth is substituted for the volatile vehicle of the paint. This higher boiling solvent becomes a substitute solvent or dispersing media for the original vehicle and liquid components carrying the paint pigment, resin, and other materials. In addition to being a higher boiling material with lower vapor pressure than the solvent originally in the paint, this substitute solvent must have the ability to dissolve or disperse the paint selectively in itself; it should be immiscible with the substrate media such as a water solution, although it may be temporarily dispersed by mechanical means in the aqueous substrate; and it should be of lower specific gravity than the water solution in order to assist in the flotation and rapid separation of the paint dispersed in this solvent.

In operation, the initial volatile solvent in the paint is vaporized in part as the material is sprayed and most of the remainder of the most volatile solvent materials is removed in the air washing portion of the spray booth which may include, for example, air washers of the type described in the U.S. Patent application of Emil Umbricht, Serial No. 444,012, filed July 19, 1954 now Patent No. 2,889,005.

Figure 2:
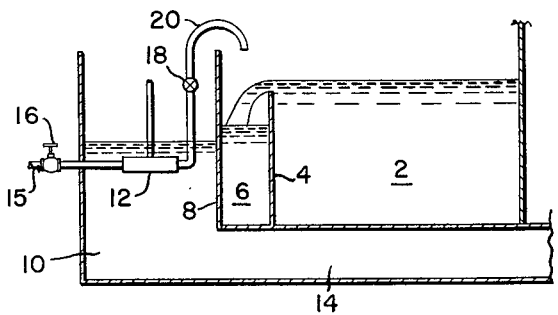

The various aspects of the invention will be better understood from a consideration of the following examples considered in connection with the accompanying drawings, in which:

FIGURE 1 is a diagrammatic plan view of a portion of a spray booth system for carrying out the invention; and FIGURE 2 is a diagrammatic sectional view taken along the line 2—2 of FIGURE 1.

In order to kill the liquid paint material to such an extent that it will not adhere to the surfaces of the spray booth, surface active agents are added to the water in the spray booth. The sodium phosphates and sodium metasilicates have been found suitable for this purpose. For example, the sodium metasilicates and trisodium phosphate gave good results with most bituminous type paint material when used in quantities such that the pH of the water solution is in the range 11.

One formulation includes a solid material to be added to the water in the spray booth and is composed of 95 parts by weight of sodium metasilicate hydrate.

$$(Na_2SiO_3 \cdot 5H_2O)$$

4.8 parts of anhydrous trisodium phosphate $(Na_3PO_4)$; 0.2 part of light lubricating oil such as Tellus Oil 33; and a trace of anti-foam agent such as silicone oil.

This reagent is added to the water in the spray booth in the approximate quantity of one pound of the reagent to 32 gallons of water. This usually will give a pH of approximately 11, but it is best that the amount be adjusted to give a pH of between 10.5 and 11 with the particular water being used.

In addition, a liquid composition is formed consisting of approximately 8.3 gallons of high-boiling, high-flash aromatic solvent; 1.4 gallons of fuel oil; 0.75 pound of stearic acid; 0.5 pound of glyceryl mono oleate; and 0.20 pound anhydrous nonionic detergent such as alkyl aryl polyether alcohol, for example such as is sold under the trade designation Triton X-114.

This liquid material is added to the spray booth water in the quantity of approximately one gallon of the liquid mixture to approximately 128 gallons of water.

In the formulation of the solid reagent, anhydrous sodium silicate ($Na_2SiO_3$) may be substituted for the hydrated sodium silicate. For many of the bituminous type paint formulations the solid reagent may be formed entirely of sodium silicate, either anhydrous or hydrated. In general, it is preferred to use between 80% and 100% by weight of anhydrous sodium silicate $Na_2SiO_3$; between 0% and 20% of trisodium phosphate $Na_3PO_4$; between 0% and 0.5% of light lubricating oil; and between 0% and .25% of silicone oil or other anti-foaming agent.

The liquid composition is largely made up of solvent components that are immiscible in the aqueous substrate but which have high solvent power for the paint component and which also contribute to the buoyancy of the treated paint. Foam depressants and corrosion inhibitors may be included if desired.

The high boiling aromatic solvent preferably is one with an open-cup flash point between 190 and 220° F. or higher.

The specific gravity preferably is between 0.928 and 0.943. A preferred range for this solvent in aniline point is 10° C. to 18° C., which is equivalent to a Kauri-butanol rating of 90 or above. The fuel oil used in the liquid composition may be ordinary No. 2 fuel oil. Oil sold under the trade designation "Sun Oil No. 2" was found particularly in this application.

The amount of high boiling point aromatic solvent used in the composition may vary between 75% and 99% by volume, and solvents having a specific gravity between 0.85 and 0.995 have given satisfactory results. The fuel oil may be omitted altogether or may comprise as much as 20% by volume of the liquid mixture depending upon the formulation of the particular paint being treated. The presence of stearic acid has been found to produce significantly better results. It serves as a foam depressant and at the same time aids in the formation of the film around the bituminous materials with a resulting colloidal structure which does not adhere to the metal parts of the spray booth. The stearic acid may be used in quantities representing from 0.25 to 3 percent by weight of the liquid composition described above.

Polyethylene glycol tertiary dodecyl thioether, manufactured by the Sharples Chemical Company and sold under the trade designation "Nonic 218," is another suitable surface active agent and can be substituted for the alkyl aryl polyether alcohol in the above formulation. The glycerol mono oleate can be used in quantities representing from 0.1% to 10% by weight of the liquid composition set forth above. The alkyl aryl polyether alcohol or the polyethylene glycol tertiary dodecyl thioether can be used in quantities representing from 0.05 to 5.0% by weight of the liquid composition set forth above. Any mixture of the latter two surface active agents can be used and the total amount preferably is between 0.05% and 5.0% by weight of the liquid composition. With some bituminous based paints, the glycerol mono oleate has given satisfactory results even though the alkyl aryl polyether alcohol and polyethylene glycol tertiary dodecyl thioether are omitted.

Apparatus suitable for carrying out the process is indicated diagrammatically in FIGURES 1 and 2. A more complete description of suitable apparatus will be found in the copending application of Emil Umbricht, Serial No. 479,039, filed December 31, 1954. As shown in FIGURE 1, the water solution containing the solid and liquid reagents described above travels from the water curtain and air washer of the spray booth (not shown) forwardly through a chamber 2, passing over the upper edge of a submerged weir 4 into a sluice trough 6, along which it moves toward the right as viewed in FIGURE 1. This trough slopes toward the right to give the desired velocity to the liquid spilling over the weir into the sluice trough. Near the right hand portion of the apparatus the liquid from the sluice trough 6 passes around the end of a vertical baffle member 8 which forms one wall of a collection trough 10. The liquid travels to the left along this collection trough 10 to a skimming and recirculation pump 12 which may be of the general type described by Emil Umbricht in U.S. patent application, Serial No. 357,450, filed May 26, 1953 now Patent No. 2,890,660, except that the opening into the pump is at the top so that when the pump is submerged just beneath the surface of the liquid, the upper layer of the liquid is separated selectively by the pump. The liquid which is not removed by the pump 12 is recirculated through the washer by means of a submerged tunnel 14 which connects into the collection trough 10 near the pump 12 and feeds the recirculating liquid into the air washer units.

The paint material which has been killed by the reagents described above and fluidized so that it floats on the surface of the aqueous solution as a continuous liquid phase which does not adhere to the walls or their parts of the spray booth system, passes into the pump 12 and may be discharged through an outlet pipe 15 to any desired collection system under the control of a valve 16. By opening a valve 18 in a return circulation pipe 20, the liquid may be recirculated into the sluice trough 6 so that the material is maintained in a constant state of agitation. In normal operation the valves 16 and 18 are each partially opened so that part of the material is continuously removed and a part is continuously recirculated. For successful operation of a system of this type it is desired that continuous recirculation of the material be provided. Desirably, the pump 12 is arranged so that it can be raised or lowered in accordance with the height of the liquid and the amount of aqueous solution that is to be collected along with the fluidized killed paint floating on the surface of the aqueous solution. The recirculation of the skimmed layer provides a better functioning of the system and permits the treatment of more paint in the cycle. In addition, the paint is fluidized to a higher degree and is maintained in the fluid state for longer periods of time, thus facilitating large scale commercial operation.

From the foregoing it will be observed that the present invention is well adapted to meet the ends and objects hereinbefore set forth and that the principles can be applied to different kinds of paint materials. So far as the general method of treatment is concerned, the invention is not limited to the particular formulations set forth herein except as set forth in the following claims.

What is claimed is:

1. In a spray booth system for killing and collecting overspray paint material in liquid dispersion for ultimate disposal, a continuously recirculating killing and collection medium therefor consisting essentially of a first reagent formed of an aqueous solution of at least about 80% by weight of sodium silicate and trisodium phosphate up to 20% and light lubricating oil up to 0.5% for killing and dispersing said paint materials, and a second reagent immiscible with said first reagent aqueous solution and consisting essentially of an aromatic hydrocarbon solvent for said paint materials having a specific gravity substantially lower than water and a boiling point substantially higher than the paint vehicle of said paint materials and an open-cup flash point at least as high as 190° F., said first and second reagents being present in approximately the ratio of one to four.

2. The composition as claimed in claim 1 wherein said second reagent also includes fuel oil in quantity not greater than 20% by volume.

3. The composition as claimed in claim 1 wherein said first reagent consists essentially of about 95 parts by weight of sodium metasilicate hydrate, about 4.8 parts by weight of trisodium phosphate, and about 0.2 part by weight of light lubricating oil.

4. The composition as claimed in claim 1 wherein said second reagent also includes between 0.1% and 10% by weight of glycerol mono oleate.

5. The composition as claimed in claim 4 wherein said second reagent also includes between 0.25% and 3.0% by weight of stearic acid.

6. The composition as claimed in claim 1 wherein said second reagent also includes between 0.25% and 3% by weight of stearic acid.

7. The composition as claimed in claim 4 wherein said second reagent also includes between 0.05% and 5.0% by weight of alkyl aryl polyether alcohol.

8. The composition as claimed in claim 4 wherein said second reagent also includes between 0.05% and 5.0% by weight of polyethylene glycol tertiary dodecyl thioether.

9. The composition as claimed in claim 1 wherein said first reagent aqueous solution has a pH between about 10.5 and 11.

References Cited in the file of this patent
UNITED STATES PATENTS

| | | |
|---|---|---|
| 1,714,598 | Hardgrove | May 28, 1929 |
| 2,201,537 | Hickler | May 21, 1940 |
| 2,216,251 | Quisling | Oct. 1, 1940 |
| 2,390,406 | Wegst et al. | Dec. 4, 1945 |